US008007355B2

(12) United States Patent
Grubmüller

(10) Patent No.: US 8,007,355 B2
(45) Date of Patent: Aug. 30, 2011

(54) ELECTRONIC ROULETTE-TYPE BETTING DEVICE HAVING DIFFERENT ODDS AT DIFFERENT POINTS IN TIME

(75) Inventor: Walter Grubmüller, Monte Carlo (MC)

(73) Assignee: Scientific Games Holdings Limited, Longford (IE)

( * ) Notice: Subject to any disclaimer, the term of this patent is extended or adjusted under 35 U.S.C. 154(b) by 691 days.

(21) Appl. No.: 11/994,127

(22) PCT Filed: Jun. 30, 2006

(86) PCT No.: PCT/AT2006/000276
§ 371 (c)(1),
(2), (4) Date: Jul. 10, 2008

(87) PCT Pub. No.: WO2007/002968
PCT Pub. Date: Jan. 11, 2007

(65) Prior Publication Data
US 2009/0227316 A1 Sep. 10, 2009

(30) Foreign Application Priority Data
Jul. 1, 2005 (AT) ................................ GM449/2005

(51) Int. Cl.
*A63F 13/00* (2006.01)

(52) U.S. Cl. ............... 463/17; 463/16; 463/21; 273/139

(58) Field of Classification Search .................... 463/17, 463/18, 19, 20, 21, 25; 273/138, 139, 142
See application file for complete search history.

(56) References Cited

U.S. PATENT DOCUMENTS 4,321,673 A 3/1982 Hawwass et al.
4,448,419 A * 5/1984 Telnaes ........................... 463/21
5,102,135 A * 4/1992 Addiechi ................. 273/142 E
5,259,616 A 11/1993 Bergmann
(Continued)

FOREIGN PATENT DOCUMENTS

GB 2 384 193 * 7/2003
(Continued)

OTHER PUBLICATIONS

"Money Wheel" which was published in Jul. 2004 and printed from http://www.dia.govt.nz/diawebsite.nsf/Files/CasDiv10MoneyWhee704/$file/CasDiv10MoneyWhee704.pdf.*

*Primary Examiner* — Dmitry Suhol
*Assistant Examiner* — Jason Skaarup
(74) *Attorney, Agent, or Firm* — Dority & Manning, P.A.

(57) ABSTRACT

An electronic roulette-type betting device and method is disclosed. The device comprises a display unit and an associated display control unit for the graphic reproduction of a roulette bowl device together with a rotating ball, at least one input unit for inputting symbols on which to bet, a time control unit for setting time limits for the betting process, said limits being reproducible on the display unit as ball rotating limits by means of the display control unit, an odds determining module that determines different winning odds for the individual symbols according to the pre-defined time limits supplied by the time control unit, a random generator for producing and transmitting random variables as winning symbols, and a comparison and evaluation unit for comparing the symbols bet on with winning symbols, and for determining and displaying wins in the event of a correlation of the symbols.

14 Claims, 6 Drawing Sheets

U.S. PATENT DOCUMENTS

| | | | | |
|---|---|---|---|---|
| 5,540,442 | A * | 7/1996 | Orselli et al. | 463/17 |
| 5,758,875 | A | 6/1998 | Giacalone, Jr. | |
| 5,775,993 | A | 7/1998 | Fentz et al. | |
| 5,788,573 | A * | 8/1998 | Baerlocher et al. | 463/16 |
| 6,209,869 | B1 * | 4/2001 | Mathews | 273/138.1 |
| 6,890,255 | B2 * | 5/2005 | Jarvis et al. | 463/17 |
| 7,112,133 | B2 * | 9/2006 | Lyons | 463/16 |
| 2001/0046893 | A1 * | 11/2001 | Giobbi et al. | 463/24 |
| 2002/0037763 | A1 * | 3/2002 | Idaka | 463/16 |
| 2003/0153384 | A1 * | 8/2003 | Duhamel | 463/29 |
| 2004/0053686 | A1 * | 3/2004 | Pacey et al. | 463/25 |
| 2005/0255904 | A1 * | 11/2005 | Duhamel | 463/17 |
| 2006/0237905 | A1 * | 10/2006 | Nicely et al. | 273/274 |
| 2007/0135203 | A1 * | 6/2007 | Nicely | 463/17 |

FOREIGN PATENT DOCUMENTS

| | | |
|---|---|---|
| JP | 2002 248 265 | 3/2002 |
| WO | WO 82/01611 | 5/1982 |
| WO | WO 94/19779 | 9/1994 |
| WO | WO 02/030532 | 4/2002 |

* cited by examiner

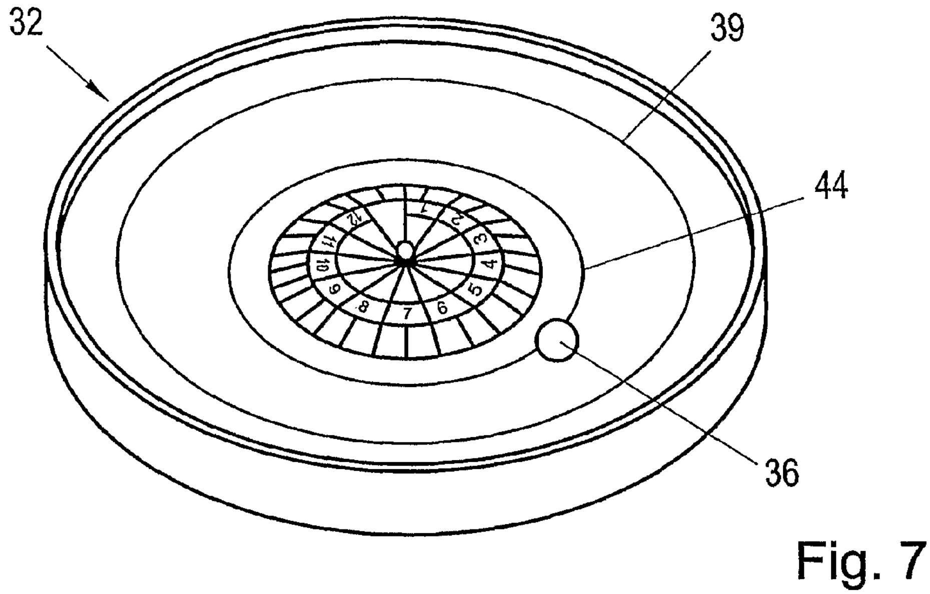
Fig. 7
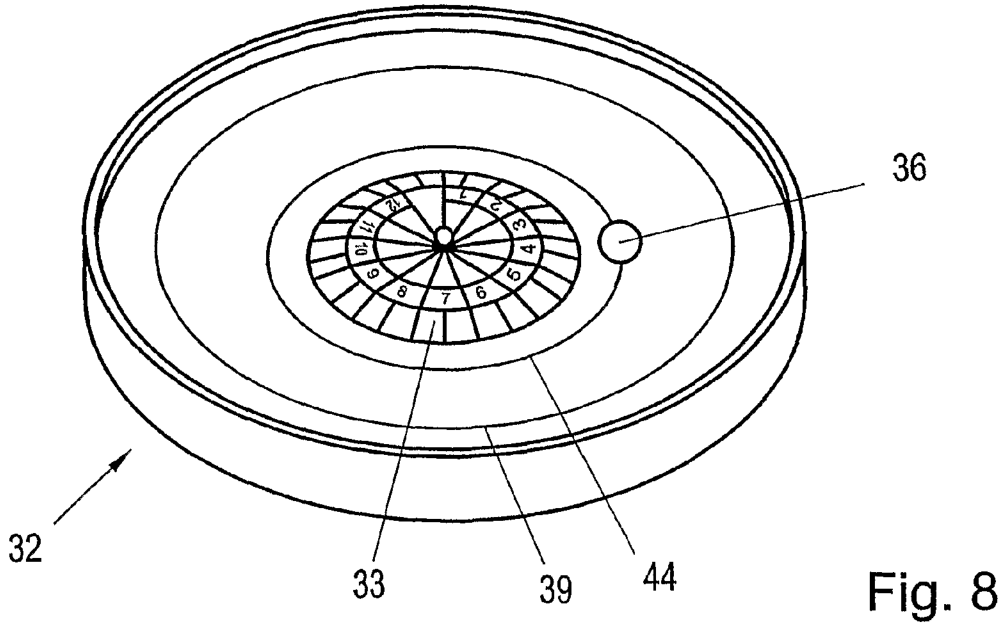
Fig. 8
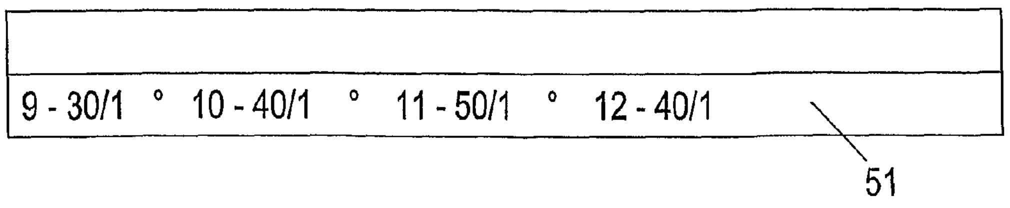

ELECTRONIC ROULETTE-TYPE BETTING DEVICE HAVING DIFFERENT ODDS AT DIFFERENT POINTS IN TIME

FIELD OF THE INVENTION

The invention relates to an electronic roulette-type betting device and a method for computer-aided roulette-type betting on symbols, in particular numbers.

BACKGROUND OF THE INVENTION

As a rule, roulette is played on a roulette table with players sitting at the table and betting on numbers, sets of numbers, and the color red or the color black. The betting process is controlled by a croupier, who throws a ball into a roulette bowl and announces the end of the acceptance of bets. The number on which the ball falls during the course of the game is not exactly accidental because both the spinning roulette bowl and the manual throwing-in of the ball by the croupier have some influence on the result of the game.

SUMMARY OF THE INVENTION

It is an object of the present invention to provide a comparable roulette game in electronic form, wherein the randomness of the respective results of the game is ensured. It is a further object of the present invention to provide the option of participation and betting to virtually any desired number of bettors, even in a decentralized form, without any limitation in terms of space by, for example, the size of a roulette table. Additional objects and advantages of the invention will be set forth in the following description, or may be apparent from the description, or may be learned through practice of the invention.

A summary of exemplary embodiments and methods of the present invention will be set forth here. Using the description provided herein, one skilled in the art will understand that additional exemplary embodiments and methods are within the scope of the present invention.

The present invention provides an electronic roulette-type betting device and a method for computer-aided, roulette-type betting on symbols.

In one exemplary embodiment of the "electronic roulette" of the present invention, a roulette bowl is displayed on a display unit, such as a screen of a player terminal, in a three-dimensional diagrammatic representation. After having presented the throwing-in of the roulette ball, the rotation of the roulette ball in the roulette bowl is reproduced in the manner of a video film. A first phase of the betting process is limited by a first time limit preset by a time control unit. The first time limit is indicated by the display unit, for instance, as a circle located relatively far outwards in the roulette bowl. The ball initially follows a relatively well approximated circular path. The ball then starts moving further inwards along the roulette bowl with its path following a roughly spiral to elliptical and, in general, non-circular course. After a defined period of time, for example 30 seconds or 1 minute, the ball will reach the first time limit, i.e. the first circle. Until that time, a player may wager on the symbols set in ball pockets in the roulette bowl, for example the numbers 1 to 12, against fixed winning odds, for example 11:1. Similar to a conventional roulette game, a "0" is also provided in the bowl. The probability of a ball falling on a betted number is thus 1:12.

When the ball reaches the first limit, i.e. the first circle, the ball spin is preferably stopped for a predetermined period of time (for example 20 seconds) by a stop unit in order to enable players to place bets on the symbols or numbers they have selected. The residual time left for this period may be continuously displayed, for example, in intervals of seconds.

After this period expires, the reproduction of the ball spin is restarted, with the ball continuing to run inwards while following an increasingly non-circular course until reaching a second time limit. The second time limit is preferably displayed on the display unit as a second, inner circle in the roulette bowl. When the ball reaches the second time limit, the reproduction of the ball spin is stopped again. The reproduction of the ball spin is then preferably "rewound" and repeated. The video reproduction of the ball spin may be performed several times by the aid of a repetition module.

During the phase of the betting process when the ball is moving from the first circle to the second circle as well as during the reproduction repetitions, the individual symbols or numbers are assigned different winning odds by an odds determination module. The assignment of betting odds is performed as a function of a random variable determined by a random generator so as to correspond with the non-circular rotation of the ball—which becomes increasingly noticeable during this phase. On account of the non-circular rotation of the ball, players having roulette experience will be able to estimate the result of the game. Consequently, experienced players will be able to either bet on the symbols they consider more likely—at lower odds—or bet with high risks on the symbols which are probably more unlikely. The display of the winning odds during this phase is preferably performed in sectors assigned to the respective ball pockets. It is also possible to display the individual symbols with the associated odds in table form in a separate reproduction area of the display unit. However, because the players will follow the course of the ball in the roulette bowl, the sectoral reproduction of the odds is preferred.

As the ball moves from the first time limit to the second time limit, i.e. from the first circle to the second circle, the device may be configured to accept no bets in view of the changing winning odds and the efforts involved with recording such bets. However, the device may also be configured to record the payout odds as a function of the time a bet is made. The device may also be configured to provide the respective betting information with, for instance, a time stamp. The device may otherwise be configured to immediately coordinate a bet with the respective odds so that the amount of the payout odds will be unambiguously assigned to a bet, thus enabling the acceptance of bets against varying odds.

The placing of bets, however, is intended to take place when the ball has reached the second limit or second circle and while the reproduction repetitions are taking place. The different payout odds, which are fixed upon the reaching of the second time limit, will be taken as the basis for the bets.

Finally, after the ball has reached the second circle and after the reproduction repetitions have been completed, the course of the ball spin is continued in the video reproduction. However, during this phase no further bets are taken. The ball in the video simulation will reach a given ball pocket corresponding to a given symbol or a given number.

The given symbol or number may previously be determined by the random generator. The random variable determined by the random generator is also used as a parameter for the computational determination of the ball orbit between the first circle and the second circle. During the phase of the betting process when the ball travels between the first circle and the second circle, variable odds for the individual symbols or numbers are determined and displayed as mentioned above. As the ball is moving from the first to the second circle, the odds can, for instance, be newly calculated and displayed in intervals of 1 second, or even at intervals of 3 seconds or 5 seconds. For instance, it is feasible to continuously change the odds from the originally fixed odds of 11:1 to values ranging, for instance, between 3:1 (for the more probable symbols) and 50:1 (for the less probable symbols). Such an odds determination by the use of technical means as a function of the respective phase of the betting process will facilitate the placing of bets for the players. The use of a random generator to generate random values to determining the winning symbols as well as to calculate the respective ball spin will prevent individual influence variables, such as the manual setting into rotation of the roulette bowl and the throwing-in of the ball, from affecting the result of the game.

In preferred embodiments of the present invention, the ball stops when the ball reaches a time limit or circle, preferably at both time limits or both circles. This enables players who have not yet wagered on a symbol to place their bets. The players might be encouraged to do so by the repetition of the video reproduction as explained above after the ball has reached the second circle. Overall, the period for an entire game or betting process may range in the order of a few minutes.

The present betting system can be installed as a game without actual stakes. However, the present system may also involve the placing of bets while fixing respective betting pools in order to ensure an attractive mode of gaming. The betting stakes are preferably input into the device electronically, whereby the respective betting stake amounts are optionally debited from a chip card comprising an originally paid overall amount. Possible wins can also be credited to the chip card. Another option is to create accounts for the respective players in a memory of a computer according to prepayments by the players. The betting stakes are then debited from the accounts and the winnings are credited to the accounts. Such a mode of procedure based on accounts maintained in a computer, or by using chip cards or similar electronic cards, is known from other systems such as electronic lottery systems or sports lotteries and need not be explained in more detail herein.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 3 to 10 are schematic illustrations of a roulette bowl device, partially with a spinning ball, as may be reproduced on the display unit according to an exemplary embodiment of the present invention. FIGS. 3 to 10 depict different phases during the course of play of an exemplary embodiment of the present invention.

DETAILED DESCRIPTION OF THE DRAWINGS

Figure 1:
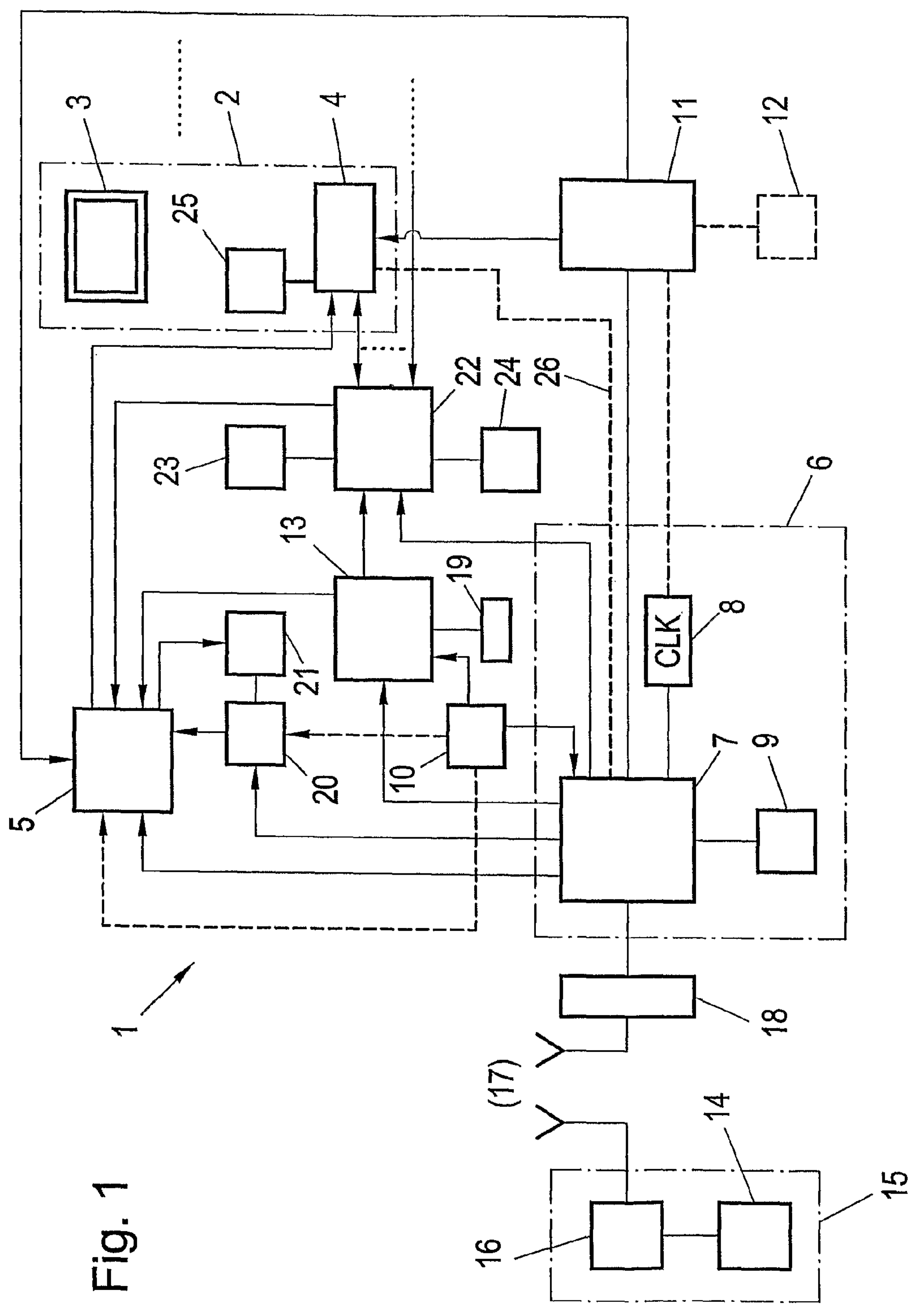
FIG. 1 provides a block diagram that schematically illustrates an electronic roulette-type betting device according to an exemplary embodiment of the present invention.

Reference is now made to embodiments of the invention, examples of which are illustrated in the drawings.

The electronic betting device 1 schematically illustrated in FIG. 1 for performing a roulette-type game or bet comprises a player terminal 2. The player terminal 2 is equipped with a display unit 3. The display unit 3 may, for instance, be a screen corresponding to a computer screen. The player terminal 2 further includes a player input unit 4. In general, several such player consoles or terminals 2 are provided in parallel in order to enable a number of players, e.g. 20 players or 50 players, to participate in the roulette game realized by the device 1. Although only one player console 2 is shown in FIG. 1, it is understood that the single player console 2 is illustrated in place of a larger number of consoles.

The display unit 3 is controlled by a display control unit 5. The display control unit 5 directs the display unit 3 to display a video reproduction of a roulette betting process as will be explained in more detail below with reference to FIG. 1 as well as to FIGS. 3 to 10. A time control unit 6 is also provided, which may, for instance, be comprised of a central control and management unit 7 associated with a clock or timer 8 as well as a memory 9. A general input unit 10 may also be provided. The central control and management unit 7, referred to herein as the central unit 7, directs the display control unit 5 to start a roulette video reproduction. On the basis of an associated time measurement beginning with the start of the video reproduction, the central unit 7 detects the reaching of two time limits and subsequently triggers the display control unit 5 or a stop unit 11 respectively. The two time limits are set according to defaults entered via the general input unit 10.

In a modification of the above described embodiment, the stop unit 11 acts autonomously. In this embodiment, the stop unit 11 is connected with the timer 8 (illustrated by the broken line in FIG. 1) and comprises its own memory 12 in order to generate, upon reaching of the set time limits deposited in the memory 12, stop signals for triggering the display control unit 5 to stop the video reproduction on the display unit 3. An essential feature of this embodiment is the ability of the stop unit 11 to block the player input unit 4 upon the reaching of the second time limit so that the input of further bets by the players will be automatically blocked from the second time limit on.

A separate odds determination module 13 is provided in order to enable the determination of different winning odds depending on the respective phase of the game. For instance, the odds of winning from the start of the game until the first time limit vary from the odds of winning from the restart at the first time limit until a second time limit. The separate odds determination module 13 is supplied with control signals from the central unit 7, particularly with regard to the time limits. The odds determination module 13 also receives information regarding the random variable from the central unit 7 in order to continuously modify the odds according to the random variable in the second phase of the betting process, i.e. from the first time limit to the second time limit. The odds are modified as a function of an algorithm based on the random variable and in the non-circular rotation of the ball in the roulette bowl indicated on the display unit 3.

The random variable is generated by the aid of a random generator 14 which may be directly associated with the central unit 7. In a preferred embodiment, where several betting devices 1 on different locations are to be managed via a central computer 15, the random generator 14 is installed with its own computation and transmission unit 16 centrally on the site of the central computer 15. The random variable or random number can, for instance, be transmitted to the individual betting devices 1 via a satellite link 17. In this embodiment, a transceiver interface 18 is assigned to the respective central unit 7 of the betting device 1 to perform any communication with the central computer or server 15 for the purpose of demanding or receiving the random number.

During the first phase of a betting process, i.e. from the starting point to the first time limit, the odds determination module 13 may determine fixed odds depending on the number of symbols or numbers (e.g. numbers 0 and 1 to 12) available to bet on. During the second phase of the betting process, the odds determination module 13 will automatically calculate the respective, changing odds, for example in intervals of 1 second, 3 seconds or 5 seconds. In another embodiment, however, it is possible to read out the respective odds (as a function of the supplied random variable) from one of several different tables stored ill a memory 19 and to supply the same for reproduction via the display control unit 5.

As already mentioned, the set time limits are displayed on the display unit 3, preferably by circular lines in the roulette bowl device, as will be explained in more detail below with reference to FIGS. 3 to 10. As likewise mentioned, a repetition of the video reproduction, i.e. of the last phase before the spinning ball reaches the second circle, is preferably also automatically started when the second circle is reached. To achieve this end, the display control unit 5 is preferably assigned its own repetition module 20, wherein a storage module 21 is further provided to receive the respective image data for this phase from the display control unit 5, and from which the image data required for the video repetition will be read out again upon activation by the repetition module 20. The repetition module 20 is preferably designed to enable the desired video reproduction to run both in the backward and in the forward directions in order to reproduce the video reproduction occurring immediately before reaching the second time limit several times. The duration of the video reproduction phase and the number of times the video reproduction is repeated can be set in advance, for example to 20 or 30 seconds, using the central unit 7 and the input unit 10.

The device 1 further comprises a comparison and evaluation unit 22, which is connected with the player input unit 4 (to be precise, with any player input unit 4 belonging to the device 1). The comparison and evaluation unit is also connected with the odds determination module 13 and the central unit 7 for the purpose of receiving the winning symbol information. The comparison and evaluation unit 22 may be associated with a memory 23 for storing the symbols or numbers wagered by the individual players as well as a further memory or memory area 24 for storing the respective winning symbols.

In the event that betting or wagering on the respective symbols involves true betting stakes, the player input unit 4 may be assigned its own chip-card and storage unit 25, with the appropriate debiting from an account provided on an inserted chip card being effected by the input unit 4 when betting on symbols and inputting betting stakes for the symbols. Conversely, if a player has bet on a symbol or number that wins, the respective winnings can be transmitted to the player input unit 4 by the comparison and evaluation unit 22 as a function of the odds fixed by the odds determination module 23, in order to effect the appropriate crediting to the chip card account via the unit 25.

Naturally, it is also possible to install a suitable account management device via the central unit 7 and its associated memory 9 to provide central account management for all players in the central unit 7 rather than the aforementioned decentralized account management. In this embodiment, the respective player input units 4 must be connected with the central unit 7 by a connection 26 illustrated as broken lines in FIG. 1.

A concrete betting process will now be explained in more detail by way of example with reference to FIG. 2 and FIGS. 3 to 10.

Figure 2:
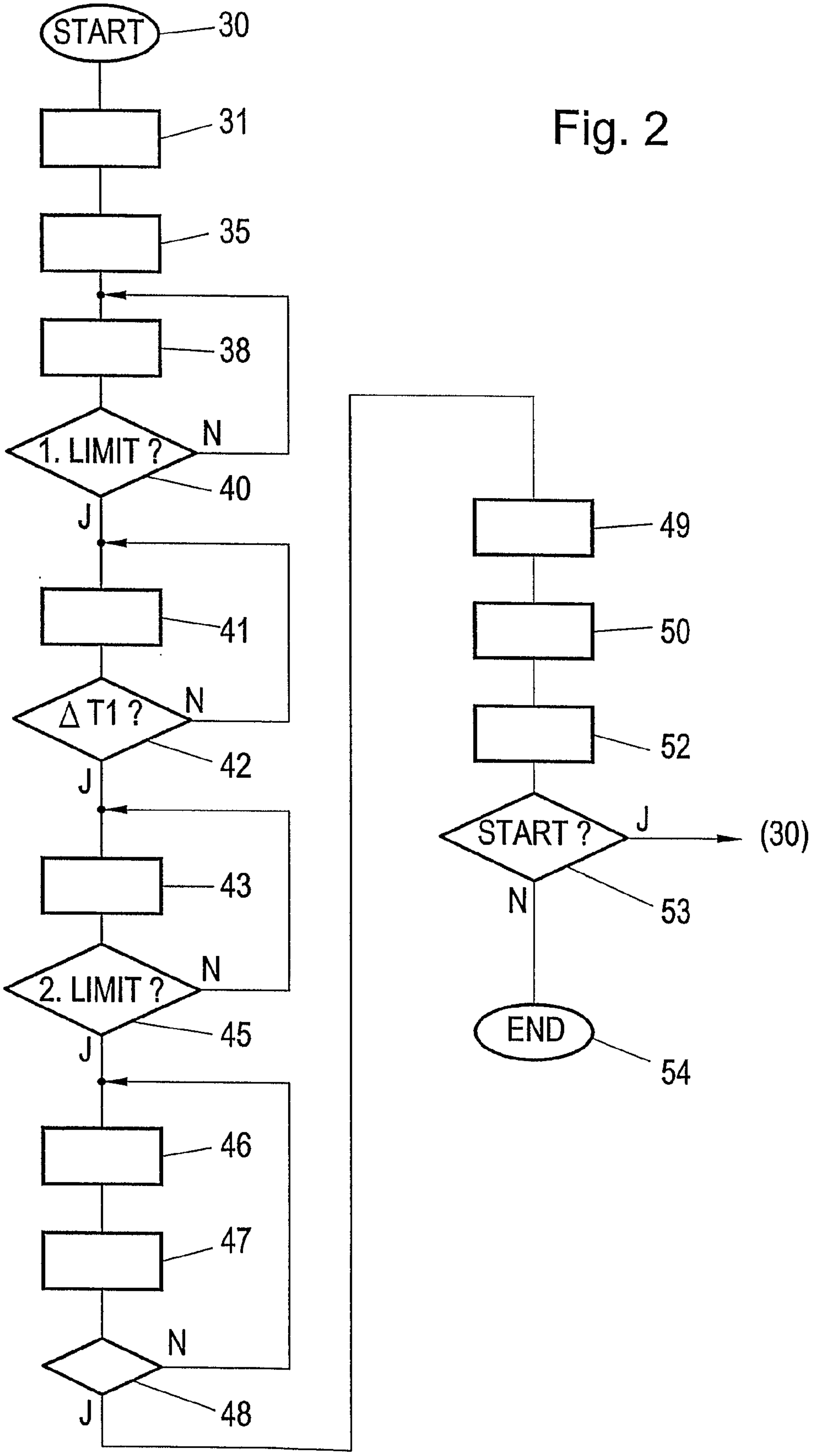
FIG. 2 provides a flow diagram that depicts the sequence of a betting process according to an exemplary embodiment of the present invention.
Figure 3:
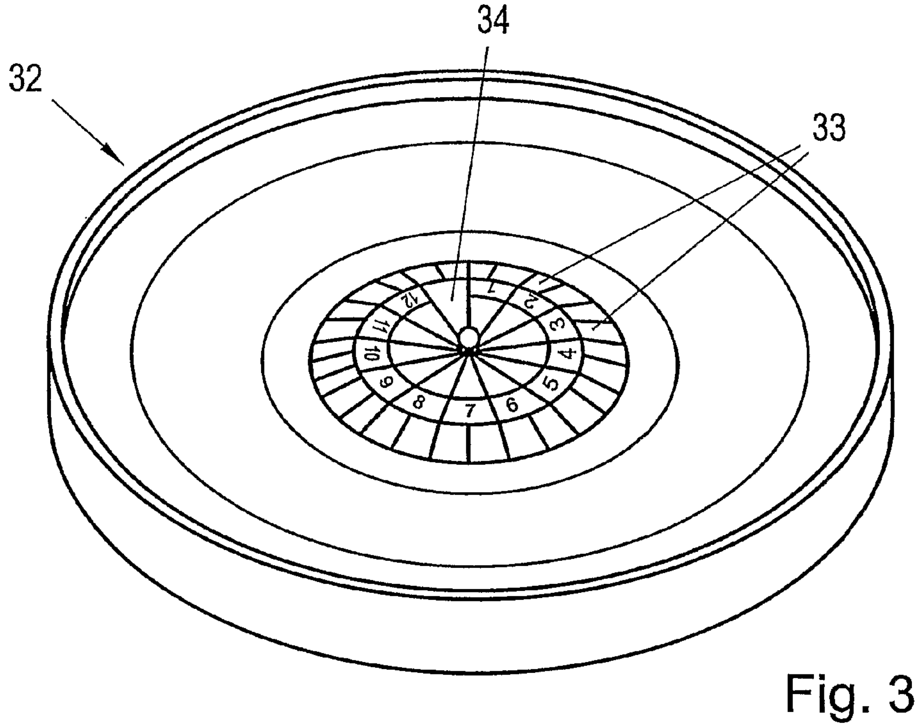
Figure 4:
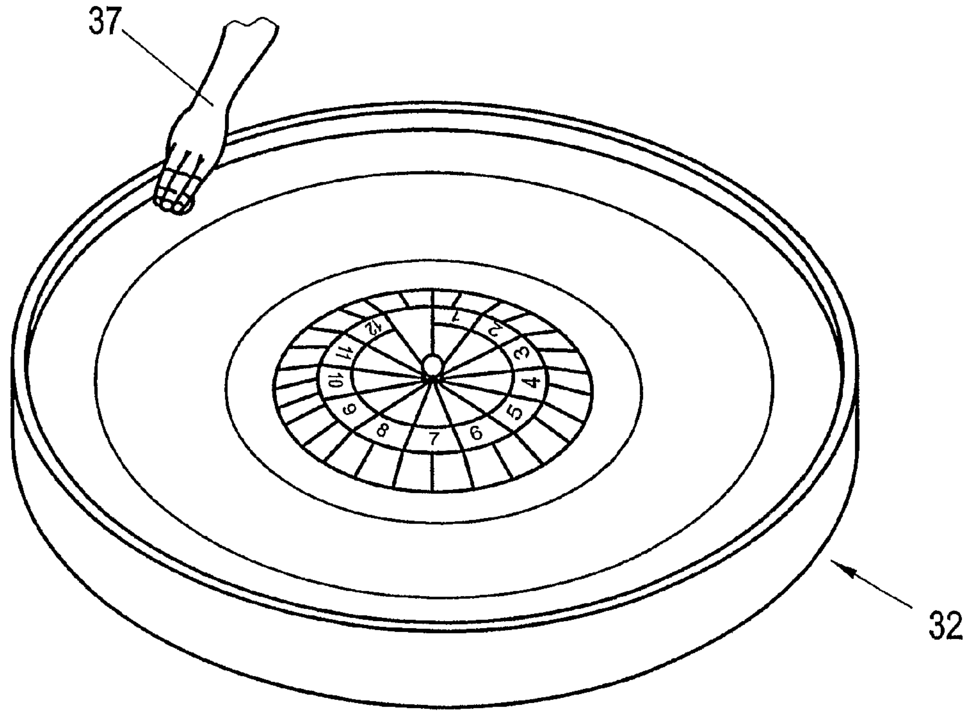

Referring now to FIG. 2, a concrete betting process is initiated by a starting step 30 (for instance, by a suitable starting input via the general input unit 10, or automatically via the central unit 7). According to block 31, the playback of information in the form of a video film to introduce the participating players takes place using the display unit 3, which is activated by the display control unit 5. The start of the introduction video is exemplified in FIG. 3, which depicts a roulette bowl device 32 that incorporates an inner ring of ball pockets 33 with associated symbols. In the embodiment shown in FIG. 3, the symbols are the numbers "1" to "12." A zero-sector 34 is also shown in FIG. 3.

Figure 5:
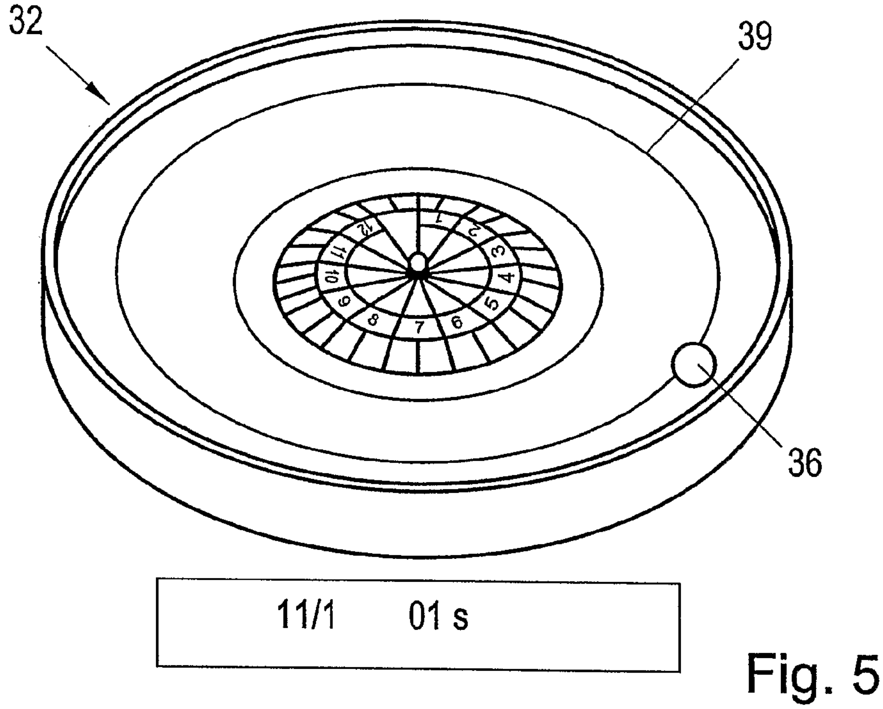

According to block 35 in FIG. 2, the betting or gambling procedure is started with the throwing-in of a ball 36 (shown in FIG. 5), for instance by the aid of a hand 37 recorded in the video reproduction (shown in FIG. 4), being displayed in the reproduction of the game process on the display unit 3. According to block 38, the display unit 3 then provides the reproduction of a ball spin from the start until a time at which the ball 36 reaches a first circle 39 according to a first time limit. In this first phase of the betting process, fixed odds, for example 11:1, are output by the odds determination module 13 and optionally displayed. When the ball reaches the first circle 39, the reproduction of the betting process is stopped using, for instance, the stop unit 11. In the flow diagram of FIG. 2 it is constantly interrogated in an interrogation field 40 whether the first time limit, i.e. the first circle 39, has actually been reached. If the time limit has not been reached, the reproduction of the ball spin and the display of the fixed odds are continued. However, when the first time limit has been reached, the reproduction of the ball spin in the roulette bowl 32 is stopped according to block 41 in FIG. 2 as mentioned above. At this point bets by the players will then be accepted at the fixed odds discussed above for a set period ΔT1 of, for instance, 20 seconds or 30 seconds. During this phase, the residual time of ΔT1 will be constantly indicated, for example by the display of "01s" along with the odds display "11/1" as shown in FIG. 5. In the diagram of FIG. 2, it is meanwhile constantly interrogated in field 42 whether the set period ΔT1 has expired or not. If the time period ΔT1 has not expired, the process is returned to block 41. In the opposite case the reproduction of the betting process will be continued according to block 43 in FIG. 2.

Figure 6:
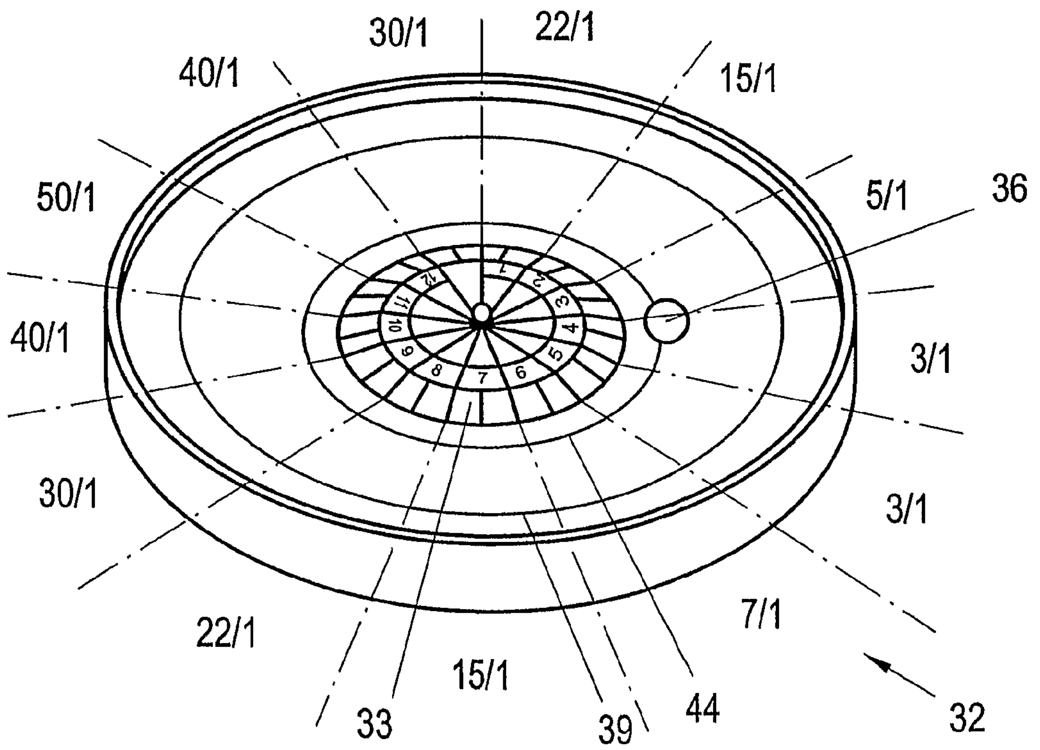

During this phase, the ball 36 will run in the region between the outer circle 39 symbolizing the first time limit and a further inwardly located circle 44 indicating a second limit. The non-circular rotation of the ball 36, which is determined by a random variable or parameters derived from such random variable, is simulated in the second phase. On account of the "non-circular" rotation of the ball 36 becoming increasingly noticeable during this phase, experienced players will be able to determine with a certain probability into which pocket 33 the ball 36 will finally "fall." These players are thus able to include this determination when placing their bets. Conversely, different odds are determined by the odds determination module 13 for the individual numbers or symbols according to the non-circular rotation of the ball (to be more precise, according to the parameters provided by the random variable). These different odds are indicated on the display unit 3, for example, as shown in FIG. 6. This indication of the odds is preferably effected in sectoral assignment to the numbers as illustrated in FIG. 6 in order to provide an optimum overview to the players.

During the period in which the ball 36 is moving from the first, outer circle 39 to the second, inner circle 44, two game variants are contemplated. According to the first variant, no bets are accepted during the time the ball 36 is rotating between the first circle 39 and the second circle 44. In this embodiment, the display of the different, changing odds can be utilized by the players to the extent they are able to recognize certain trends in the odds development and implement the same with regard to which of the pockets 33 the ball 36 will finally fall into. During that period, the stop unit 11 and/or the central unit 7 will block any bets players might wish to place with the input unit 4.

According to the second variant, betting on the part of the players may be admitted during the period of time the ball 36 is moving from the outer circle 39 to the inner circle 44. In one embodiment, the odds of winning (calculated by the odds calculation module 13) associated with each bet are immediately added to each bet in real time as a function of the time of the placing of a bet (via the input unit 4) and are temporarily deposited by the comparison and evaluation unit 22 in the memory 23. In another embodiment, the betting data are marked with time stamps and deposited in the memory 23. The respective winning symbol and the odds associated with different time stamps assigned to the winning symbol are saved in the memory 24. This enables a comparison of the betted symbols (read from the memory 23) with the winning symbols (read out from the memory 24) and the assigned winning odds, which are a function of the time of placing of the bet.

FIG. 6 concretely depicts the situation in which the ball 36 has reached the second, inner circle 44, i.e. the second time limit. This is interrogated in the field 45 of the flow diagram of FIG. 2. When the second time limit has been reached, the acceptance of further bets will be permitted at the different odds indicated. A repetition of the last phase of the betting process will follow (for example the last 10 seconds, 20 seconds or 30 seconds before the ball will have reached the inner circle 44) to provide additional information for the players and to provide further incentive to the player to place bets. The rewinding and forwarding of the reproduction is also feasible during this phase. The repetition of the reproduction may be performed several times and is controlled by the repetition module 20 of FIG. 1. The number of times the reproduction is repeated is interrogated according to the interrogation field 48 of FIG. 2.

When the reproduction repetition phase is completed, a still with the ball 36 being located on the inner, second circle 44 may briefly be shown. An indication that no more bets will be accepted may also be included. This situation is illustrated in FIG. 7 and corresponds to block 49 in the flow diagram of FIG. 2. After this phase, the "video" with the spinning ball 36 continues to play from the second circle 44 until the end with no bets being allowed any longer. This corresponds with block 50 of the flow diagram of FIG. 2 and is illustrated in FIG. 8. The winning odds for the individual numbers at the end of betting are displayed in a display field 51, for example in the manner of a running belt as shown in FIG. 8.

Figure 9:
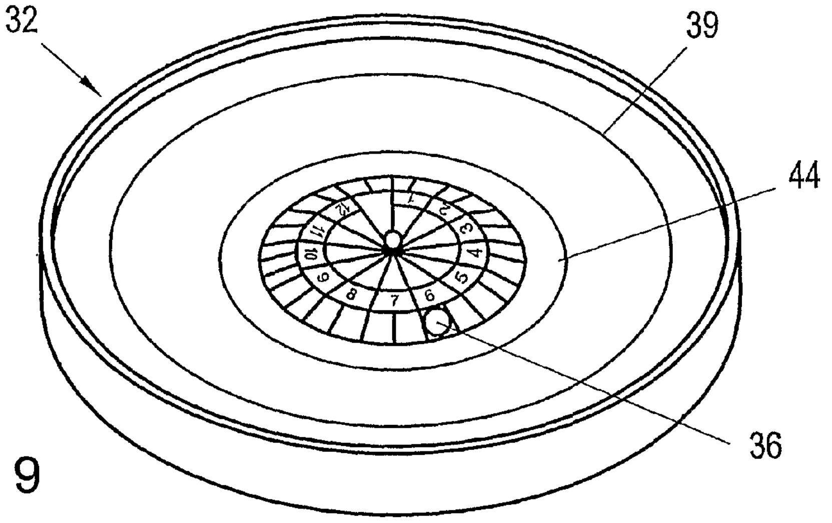
Figure 10:
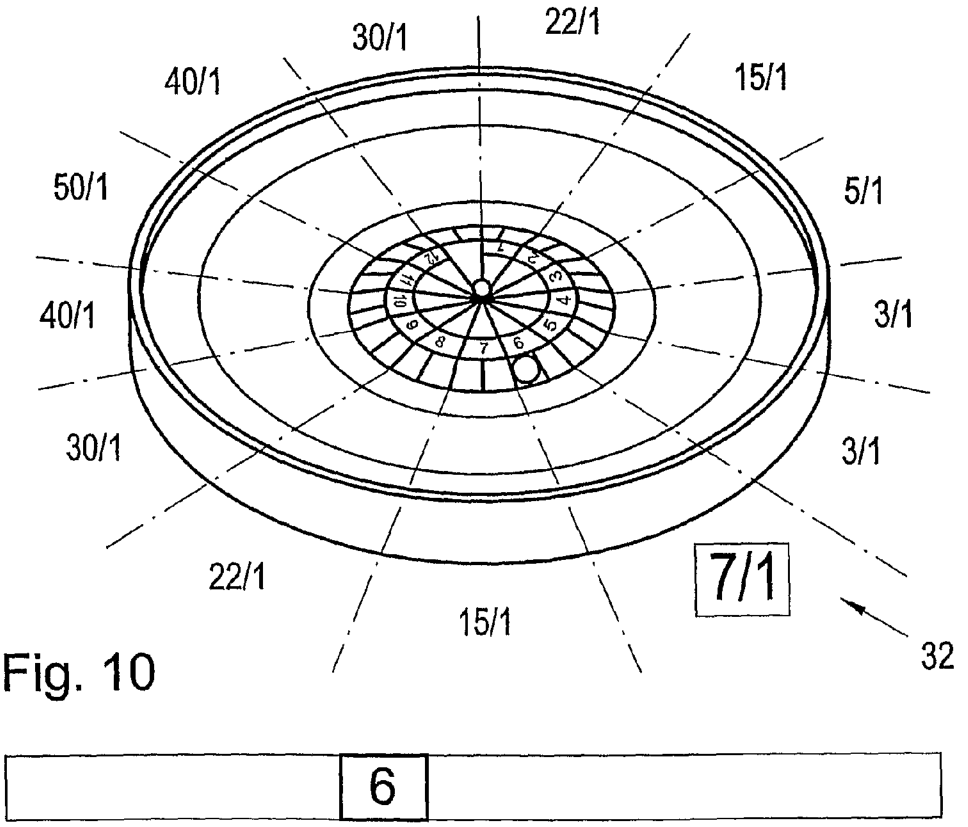

The situation at the end of the betting process according to block 52 of FIG. 2 is shown in FIG. 9. FIG. 9 shows that the ball has landed in one of the two pockets 33 representing the number "6". As is apparent, this exemplary embodiment comprises two ball pockets 33 each assigned to a number available for a bet. Subsequently, the winning situation is displayed as shown in FIG. 10. FIG. 10 displays the odds while highlighting the actual winning odds, for example 7/1 and displays the final winning symbol, for example 6.

According to an interrogation field 53 in FIG. 2, it may then be interrogated whether a restart is to be effected (which may, for instance, also be provided as a default value). If a restart is to be effected, the process will be returned to the start 30 of the flow diagram of FIG. 2. Otherwise, the end of the betting process will be reached in field 54.

In the exemplary embodiments discussed herein, it is possible to provide more or fewer numbers, or even other symbols like figures, etc., as symbols to bet on. Furthermore, it is conceivable to implement the overall control of the betting process in a central station (for example the server/computer 15 in FIG. 1) and to provide decentralized player consoles 2 as well as the required communication units and interfaces in various gambling places. It is also possible in the second phase of the betting process, as the ball is "rolling" from the first circle 39 to the second circle 44, to calculate changed odds for the individual symbols once and then keep these odds rather than constantly determining new odds. In this embodiment, players may gain a better overview of the process and, in addition, the assignment of the betting odds to the respective bets will also be facilitated because they will no longer change during this phase.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. An electronic roulette-type betting device, comprising:

a display unit for graphically depicting a roulette bowl having a plurality of symbols wagered on by players;

a time control unit for setting a first time limit position and a second time limit position, the display unit configured to display a video representation of a roulette ball rotating in the roulette bowl between the first time limit position and the second time limit position;

a random generator for generating a random variable;

an odds determination module for using the random variable to determine a winning symbol and winning odds associated with each of the symbols;

the odds determination module configured to determine varying winning odds as a function of the random variable as the roulette ball moves between the first time limit position and the second time limit position, with the roulette ball moving in a non-circular rotation in the roulette bowl from the first time limit to the second time limit wherein the varying winning odds are determined based on the non-circular rotation of the ball as defined by the random variable such that the varying winning odds are lower for a symbol on the roulette bowl where the bowl is more likely to stop and higher for a symbol on the roulette bowl where the ball is less likely to stop; and an input unit configured to receive wagers by the players on the symbols when the roulette ball reaches the second time limit position.

2. The electronic roulette-type betting device of claim 1, wherein the device further comprises a stop unit for stopping the video representation of the roulette ball spinning in the roulette bowl when the roulette ball reaches the second time limit position.

3. The electronic roulette-type betting device of claim 2, wherein the device further comprises:

a memory module for storing the video representation of the roulette ball spinning in the roulette bowl; and a repetition module for repeating a portion of the video representation of the roulette ball spinning in the roulette bowl on the display unit.

4. The electronic roulette-type betting device of claim 3, wherein the repetition module is configured to reproduce the portion of the video representation in the forward direction and the backward direction.

5. The electronic roulette-type betting device of claim 1, wherein the display unit is configured to display a video representation of the roulette ball rotating in the roulette bowl before the first time limit position and the odds determination module is configured to generate fixed winning odds before the roulette ball reaches the first time limit position.

6. The electronic roulette-type betting device of claim 1, wherein the display unit is configured to display the varying winning odds as the roulette ball moves between the first and second time limit positions.

7. The electronic roulette-type betting device of claim 6, wherein the odds associated with each symbol are displayed in sectoral assignment to each symbol.

8. A method for electronic roulette-type betting on symbols, the method comprising:

graphically depicting a roulette bowl having a plurality of symbols wagered on by players via a display unit;

displaying a video representation of a roulette ball rotating in the roulette bowl between a first time limit position to a second time limit position via the display unit;

generating a random variable via a random generator and using the random variable to determine a winning symbol and winning odds associated with each of the symbols;

determining varying winning odds as a function of the random variable as the roulette ball moves between the first and second time limit positions via an odds determination module;

generating and displaying an increasingly non-circular rotation of the roulette ball in the roulette bowl from the first time limit position to the second time limit position in the roulette bowl;

wherein the varying winning odds are determined based on the non-circular rotation of the ball as defined by the random variable such that the varying winning odds are lower for a symbol on the roulette bowl where the bowl is more likely to stop and higher for a symbol on the roulette bowl where the ball is less likely to stop; and receiving wagers by the players on the symbols when the roulette ball reaches the second time limit position via an input unit.

9. The method of claim 8, wherein the method further comprises the display unit stopping the video representation of the roulette ball spinning in the roulette bowl when the roulette ball reaches the second time limit position.

10. The method of claim 9, wherein the method further comprises storing in a memory module the video representation of the roulette ball spinning in the roulette bowl and repeating a portion the video representation of the roulette ball spinning in the roulette bowl on the display unit.

11. The method of claim 10, wherein the method comprises displaying the portion of the video representation in the forward direction and the backward direction via the display unit.

12. The method of claim 8, wherein the method comprises displaying a video representation of a roulette ball rotating in the roulette bowl via the display unit before the first time limit position and generating, via the odds determination module, fixed winning odds during the video representation of the roulette ball rotating in the roulette bowl before the first time limit position.

13. The method of claim 8, wherein the method comprises displaying the varying winning odds as the roulette ball moves between the first and second time limit positions via the display unit.

14. The method of claim 13, wherein the method comprises displaying the varying winning odds in sectoral assignment to each symbol via the display unit.

* * * * *